United States Patent [19]

Chelton

[11] 4,104,164
[45] Aug. 1, 1978

[54] DEVICE FOR TREATING WASTE WATER

[76] Inventor: Robert G. Chelton, 1337 SW. 21 Ter., Ft. Lauderdale, Fla. 33312

[21] Appl. No.: 773,703

[22] Filed: Mar. 2, 1977

[51] Int. Cl.² .................. C02B 5/00; B08B 3/10; B60S 3/04
[52] U.S. Cl. .................. 210/136; 210/167; 210/195 R; 210/196; 210/257 R; 210/258; 210/261
[58] Field of Search .......... 210/73 R, 73 SG, 167, 210/195 R, 196, 257 R, 258, 260, 261, 262, 275, 279, 136

[56] References Cited

U.S. PATENT DOCUMENTS

| 2,922,173 | 1/1960 | Lind et al. | 210/167 X |
|---|---|---|---|
| 3,253,431 | 5/1966 | Minhinnett | 210/196 X |
| 3,384,239 | 5/1968 | Berardi | 210/73 R |
| 3,502,215 | 3/1970 | Cahan | 210/167 |
| 3,550,778 | 12/1970 | Kesselman | 210/167 |
| 3,774,625 | 11/1973 | Wiltrout | 210/167 X |
| 3,850,805 | 11/1974 | Armstrong | 210/167 |
| 3,923,658 | 12/1975 | Lancaster | 210/167 X |
| 3,931,009 | 1/1976 | Davis | 210/257 R X |

*Primary Examiner*—Frank A. Spear, Jr.
*Assistant Examiner*—Robert H. Spitzer

[57] ABSTRACT

A system for continuously treating waste water from laundries, car washers and like cleaning establishments to recover water soap, detergents, and other chemicals. The process of using the system is carried out by flowing the untreated water through sand chambers to remove heavy sediment, collecting the water from the sand chambers in a storage compartment, pumping the water through a centrifugal separator for removal of large particulate matter and then through a filter containing media for removal of flocculated soaps, detergents, waxes, and other particulate matter, thence into a filtered water storage compartment. The water is pumped from the filtered water storage compartment by a pressure pump. Part of the water containing unused soaps, detergents, conditioning agents, and other chemicals is returned from the filtered water storage compartment for reuse, the other part enters a filter containing absorptive media for removal of the remaining soaps, detergents, conditioning agents, organic compounds and other chemicals. The water is thence returned as pure rinse water to the cleaning establishment. Backwash water from the filters is returned through a separate bag filter recovering the water and leaving behind solids in the bag for removal and easy disposal.

7 Claims, 2 Drawing Figures

DEVICE FOR TREATING WASTE WATER

STATEMENT OF PRIOR ART

Cleaning establishments using water, laundries, car washes, truck and bus washes and railway car washes, share a common pollution problem: The water after it has been used to clean contains the soils from the item cleaned plus the detergents, soaps, chemicals, waxes and conditioning agents used in the cleaning process. Hitherto, waste waters from such cleaning establishments have been conveniently disposed of to water courses, sewers or leach fields.

With consequent deterioration of water courses, upsetting and overloading of sewage plants and poisoning of ground waters, public clamor and enforcement officials have forced cleaning establishments to close or to properly treat their effluent waters. At the same time, costs for soaps, detergents, chemicals, waxes and conditioning agents and for water and sewer charges have risen dramatically.

Accordingly, it would be extremely beneficial, ecologically and economically, if a method, device or system could be constructed to solve the pollution problems associated with cleaning establishments while at the same time reducing operating costs.

REFERENCE TO PRIOR ART

A partial and unsatisfactory answer to the waste water problem has been in existence for many years. Some cleaning stations have had holding basins or tanks with various baffles, pits and/or screens. In others, the water would be recycled through special filters, as in U.S. Pat. No. 3,384,239, and clear makeup water used to backwash the filters.

GENERAL DESCRIPTION OF THE INVENTION

The subject invention solves the pollution problems of cleaning establishments, while recovering soap, detergents, chemicals and conditioning agents and recovering water and eliminating sewer charges. It accomplishes these ends much more efficiently and efficaciously and in greater measure than the aforementioned holding basins and tanks with their associated baffles, pits and screens.

OBJECTS OF THE INVENTION

It is an object of the invention to provide an improved water recovery system.

Another object of the invention is to provide a water recovery system that is simple in construction, economical to manufacture, and simple and efficient to use.

Another object of the invention is to provide a water recovery system which utilizes filters, centrifugal separators and like equipment for separating a part of the water containing a concentrated solution of soaps, detergents, and conditioning agents and filtering the remainder of the water and returning the filtered water as rinse water.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
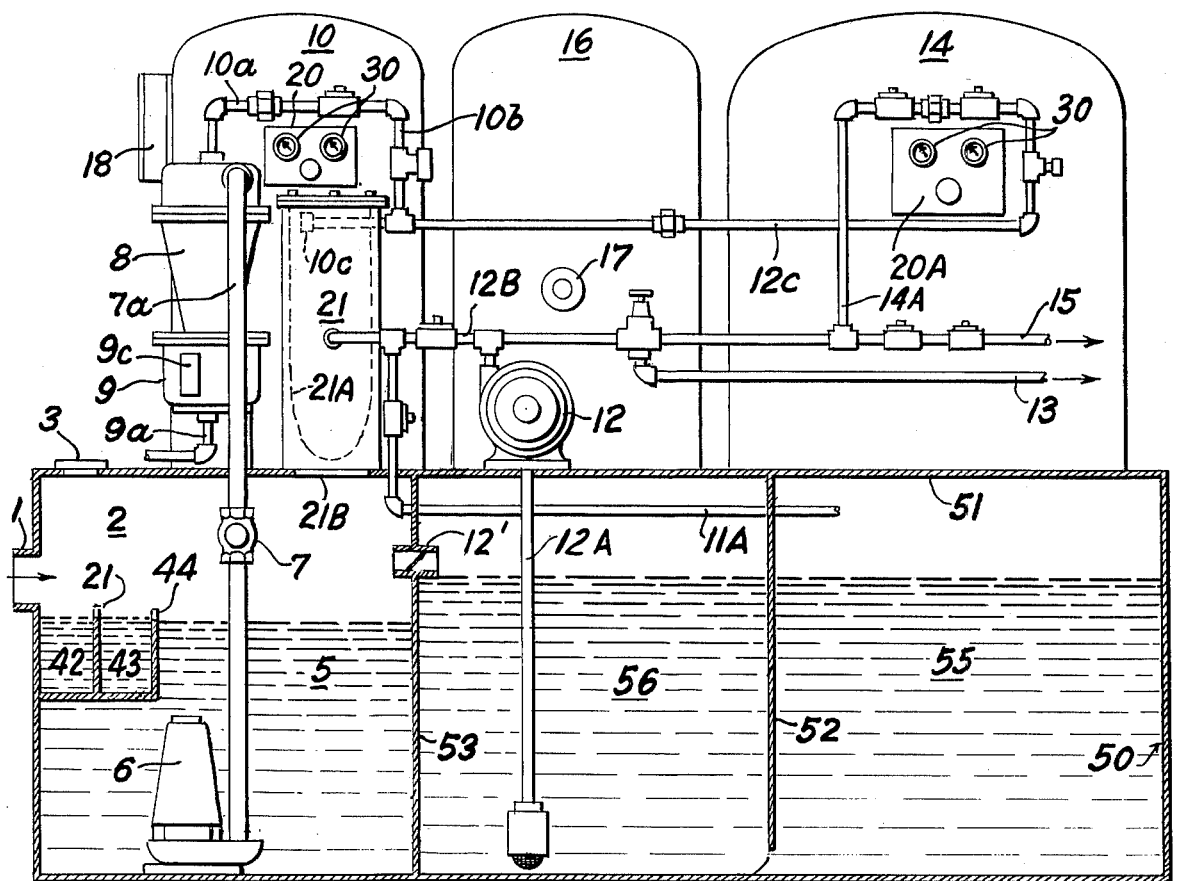
FIG. 1 is a side view of the apparatus.
Figure 2:
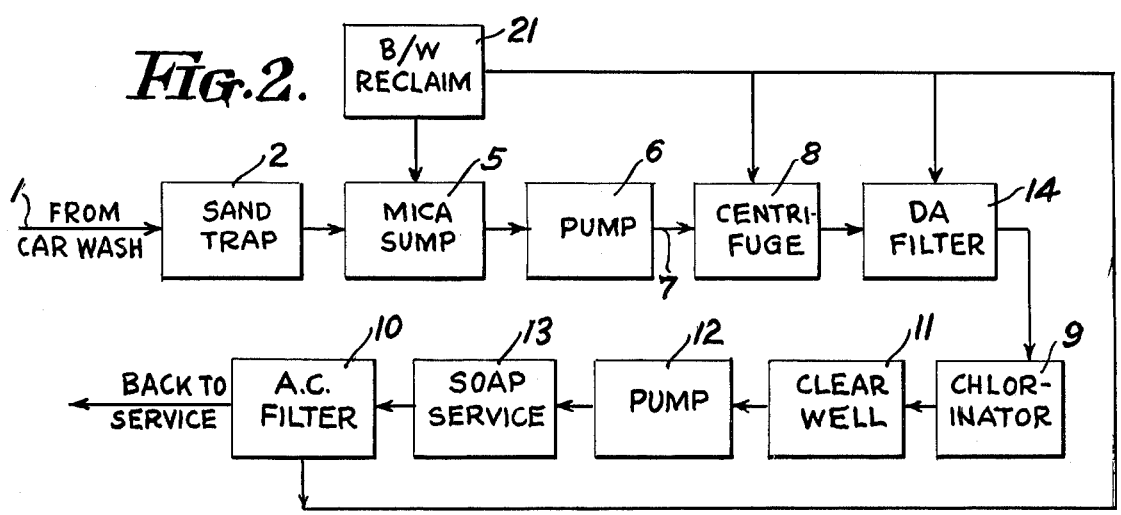
FIG. 2 is a flow diagram of the apparatus according to the invention.

Now with more particular reference to the drawings, the system according to a preferred embodiment of the invention is made up of a tank 50 that is generally rectangular in horizontal cross section. The tank 50 is divided into an unfiltered water well 5 and a filtered water well 11 separated by a partition 53. The tank 50 has a top 51, a bottom 54, and sides and ends. A baffle 52 separates the filtered water well into a first compartment 55 and a second compartment 56. The compartments 55 and 56 are connected at 57. The tank has an inlet 1. A check valve near the top of the partition 53 allows water to flow from the compartment 56 in the filtered water well 11 back into the unfiltered water well 5. A sand trap 2 is supported on the end wall of the tank below the inlet 1. Water entering inlet 1, overflows from compartment 42 in sand trap 2 over partition 21 to compartment 43 and through wier 44 in the sand trap into the unfiltered water well 5.

The top of the tank 50 has a manhole 3 through which the sand trap may be serviced. A hole in top 51 is disposed below backwash reclaim unit 21 so that backwash water can return from bag 21A. The centrifugal filter 8 has a solids receiver 9 connected to it. Wash water filter 10, pressure tank 16, and rinse water filter 14, and pressure pump 12 are all supported on the top 51 of the tank 50.

Water entering inlet 1 passes through sand trap 2. Unfiltered water well 5 is pumped into the centrifugal separator 8 to the wash water filter 10 and into the filtered water well 11. Water is pumped from filtered water well by pump 12 against a head of pressure in tank 16 selectively to an outlet 13 through which water still containing soap can go to a wash valve in a car wash or the like, or, the water from pump 12 can be directed through the rinse water filter 14 and out the outlet 15 to a source of rinse water. Clear water from the rinse water filter 14 can also be returned to the backwash filter 21 and thence to the backwash reclaim unit where the water will return through the opening 21B in the cover 51 below the open bottom of the backwash reclaim unit where water may return after having been filtered through the bag 21A to the unfiltered water well.

Waste water from the cleaning establishments containing large amounts of contaminants, such as silt, dirt, soils, organic compounds, soaps, detergents, waxes, chemicals and conditioning agents, enters through the inlet 1 into the dual sand removal chamber means 2 where the gross solids are removed. A hatch 3 above the sand chambers permits access means to the chambers for removal of accumulated settled solids. The partially clarified water overflows the second wier 44 of the sand chambers into the unfiltered water storage well 5. A submersible pump 6, especially sized for the application, continuously pumps the waste water through a check valve 7 and thence into a centrifugal separator 8. The waste water pumped at high speed through pipeline 7A enters on the tangential inlet of the centrifugal separator 8.

Centrifugal force moves the larger and heavier particles to the outer wall of the separator. The flow of water in the separator is comprised of two opposite spirals, the first down against the outer wall of the separator in a clockwise direction as seen from the top and then in a counter clockwise spiral up and out the top discharge. The heavier particles, kept against the outer wall by their greater inertia are swept into the solids receiver 9. A sight glass 9C on the solids receiver permits monitoring the level in the receiver. A purge valve on the effluent line 9A at the bottom of the receiver permits discharge of the accumulated solids from the solids receiver.

The partially purified water with part of the entrained particles removed from the top of the separator next flows through pipeline 10A, 10B, and 10C and enters the wash water filter 10 near the top for removal of the remaining suspended solids, flocculated soaps and detergents, waxes and other particulate matter.

The filter 10 used to filter the wash water may be of the type wherein the unclean liquid is received in the top of the tank and flows down through filter media such as gravel, sand, or anthrafill. The pressure from the sump pump 6 will be sufficient to force water through the centrifugal filter and through the filter 10 to the inlet to the pump 12. The filter 14 may be made, for example, like the filter shown in U.S. Pat. No. 2,057,237.

The filter 21 contains one of various filter media 21A of size and type especially chosen for the application. Filtered water leaving the bottom of the wash water filter 10 is conveyed through the pipeline 11A into the clear water storage well 11. An overflow check valve 12' permits excess water in the clear water storage well to flow back into the unfiltered water storage well 5. At the same time it prevents flow in the reverse direction. It also eliminates any need for control of the level in the filtered water storage by starting and stopping the sump pump 6.

The pressure pump 12 draws clear filtered water up through pipeline 12A and then pumps it out through pipeline 12B and thence through return connection point 13 and additionally through line 12C into the rinse water filter 14.

Pressure tank 16 is connected to pump 12 and pipeline 12B. Pump 12 is turned on and off, by a conventional pressure switch located in control box 18, to maintain set point pressure in pressure tank 16. Air volume control 17 maintains the proper volume of air in pressure tank 16 to provide a pneumatic cushion and minimize pressure fluctuations and start up and shut down of pump 12.

The return connection 13 is connected to the wash water return line of the cleaning establishment. The filtered water at this point still retains unflocculated and unused soap, chemicals and conditioning agents. These materials and the water are returned to the cleaning establishment's washing process and thus are recycled and reused, effecting an important economic savings.

The remaining filtered water flows through line 12C into the rinse water filter 14. The rinse water filter 14 contains specially chosen absorptive filter media, which may be comprised of, but are not limited to, certain grades of activated carbon. Exiting the bottom of the absorptive filter through pipeline 14A, the treated water with detergents, soaps, conditioning agents, organic compounds and other chemicals removed, flows through outlet connection 15. Outlet connection 15 is connected to the cleaning establishment's rinse water supply system. Thus the entire influent to the reclamation unit is treated and returned to the using process; a portion containing soap, etc., returned through outlet 13 and the remainder completely treated and returned through outlet 15.

A backwash control consoles 20, one at each filter, each have two pressure gauges and a backwash control, pilot valve knob. The pressure gauges 30 on control panel 20 indicate pressure in the lines before and after the filters. When the differential pressure between the gauges for a filter exceeds a certain value, backwash of the filter is required.

Backwash of the filter is accomplished by operator rotation of the pilot valve knob 20 into the backwash position.

Backwash water containing accumulated solids leaves wash water filter 10 through line 10B and into backwash reclaim tank 21. Backwash water containing accumulated solids leaves wash water filter 10 through pipeline 14B and into backwash reclaim tank 21. A filter bag 21A inside the reclaim tank 21 collects the solids, but allows the water to exit through the open bottom 21B of the filter reclaim tank and into the unfiltered water storage well 5. Thus even the backwash water is recovered. Periodically the filter backwash reclaim tank lid can be removed by loosening thumbscrews. The filter bag 21A inside can then be lifted out and the solids can be easily dumped from the bag 21A into a container for landfill disposal.

Under certain conditions and/or for special requirements coagulants, flocculants and sterilizing agents and/or additional equipment may be required in addition to and in conjunction with the subject device, system, method. In addition, for certain applications some part of the system, such as the reclaim tank, may not be required for a given application. With such deletions and/or with the additions above, the basic device (system or method) is the controlling and important factor in fulfilling the treatment and recovery of the waste water.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A recirculating filter system for treating wash water containing contaminated components made up of cleaning components and sediment components comprising, a generally rectangular tank having a top,
a centrifugal filter,
a wash water filter containing gravel, sand and anthrafil,
a pressure tank,
a rinse water filter containing activated charcoal,
and a backwash reclaim unit supported on said tank top, and connected to said rinse water filter and said tank,
said tank having a partition therein dividing said tank into an unfiltered storage well and a filtered storage well,
an inlet to said unfiltered storage well adapted to be connected to a source of unfiltered water, a sand trap in said unfiltered well disposed to receive water from said inlet, wier means from said sand trap through which water may flow to said unfiltered well, a submersible pump disposed in said unfiltered well, check valve means connecting said submersible pump to said centrifugal filter, means connecting said centrifugal filter to said wash water filter, and means connecting said rinse water filter to said filtered water well, a pressure pump having an inlet in said filtered water well and selective valve means for connecting the output of said pressure pump to a wash water supply, and to said pressure tank, and means selectively connecting the output of said pressure pump to said rinse water filter whereby a part of said water can be used with dissolved cleaning components therein and the other part of said water having said cleaning components removed therefrom can be used as rinse water.

2. The system recited in claim 1 wherein a solids receiver is connected to said centrifugal filter for receiving solids removed from said water by said centrifugal filter.

3. The system recited in claim 1 wherein a backwash filter is provided, and means connecting the output of said rinse water filter to said backwash filter, said backwash filter being supported above said unfiltered storage well whereby backwash water from said rinse water filter is directed through wash water filter and through said backwash reclaim unit, and the water from said backwash reclaim unit is directed into said unfiltered water well.

4. The system recited in claim 3 wherein said backwash filter has a filter element therein, said filter element comprising a bag.

5. The system recited in claim 4 wherein said backwash filter is a cylindrical member having an open bottom, said cylindrical member rests on said tank over a hole therein over said unfiltered water well.

6. The system recited in claim 5 wherein said cylindrical member has a removable top, said removable top comprises means supporting said bag in said cylindrical member.

7. The system recited in claim 1 wherein a check valve connects said filtered well with said unfiltered well whereby excess filtered water is returned to said unfiltered water well thereby controlling the level of water in said unfiltered well.

* * * * *